UNITED STATES PATENT OFFICE.

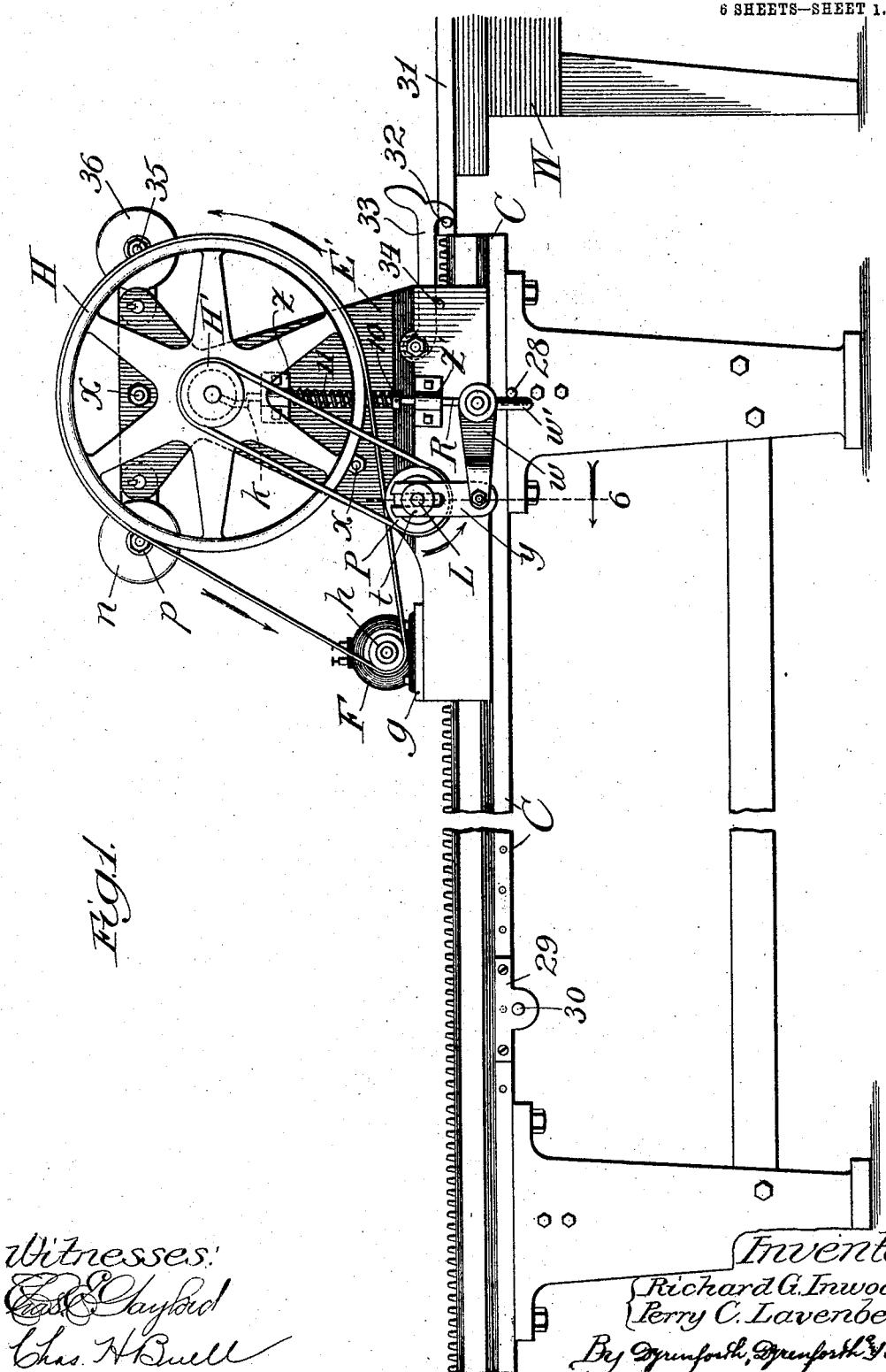

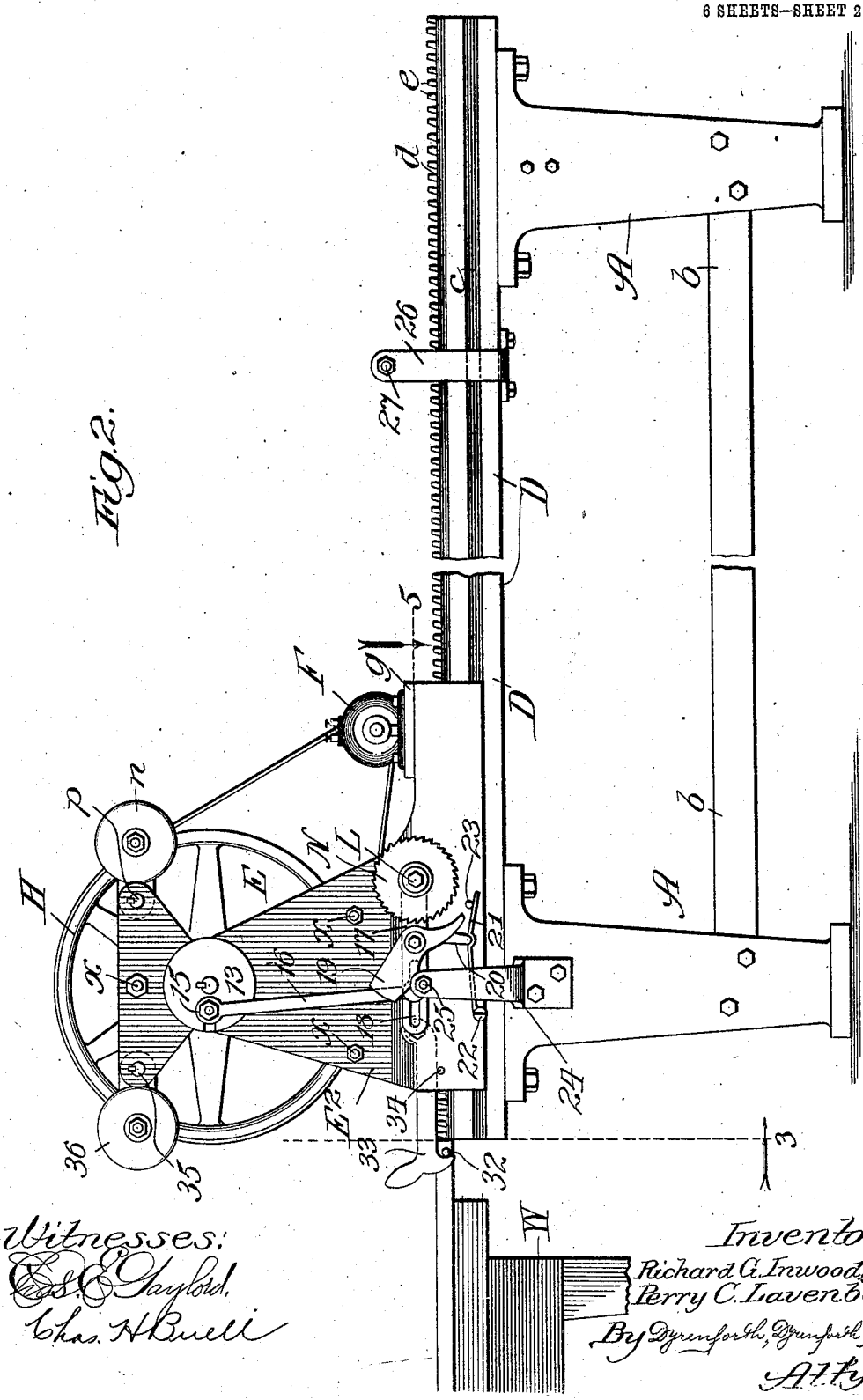

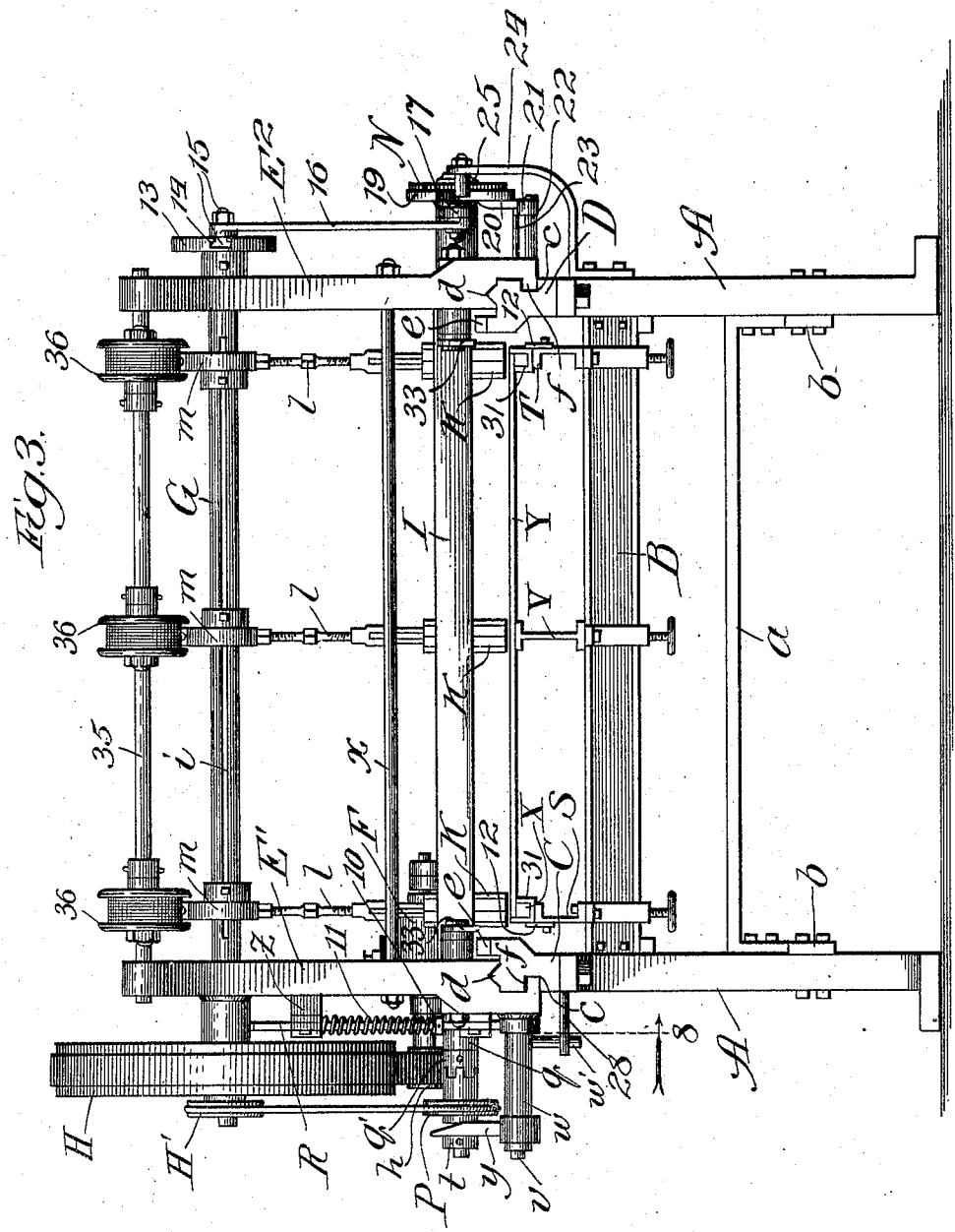

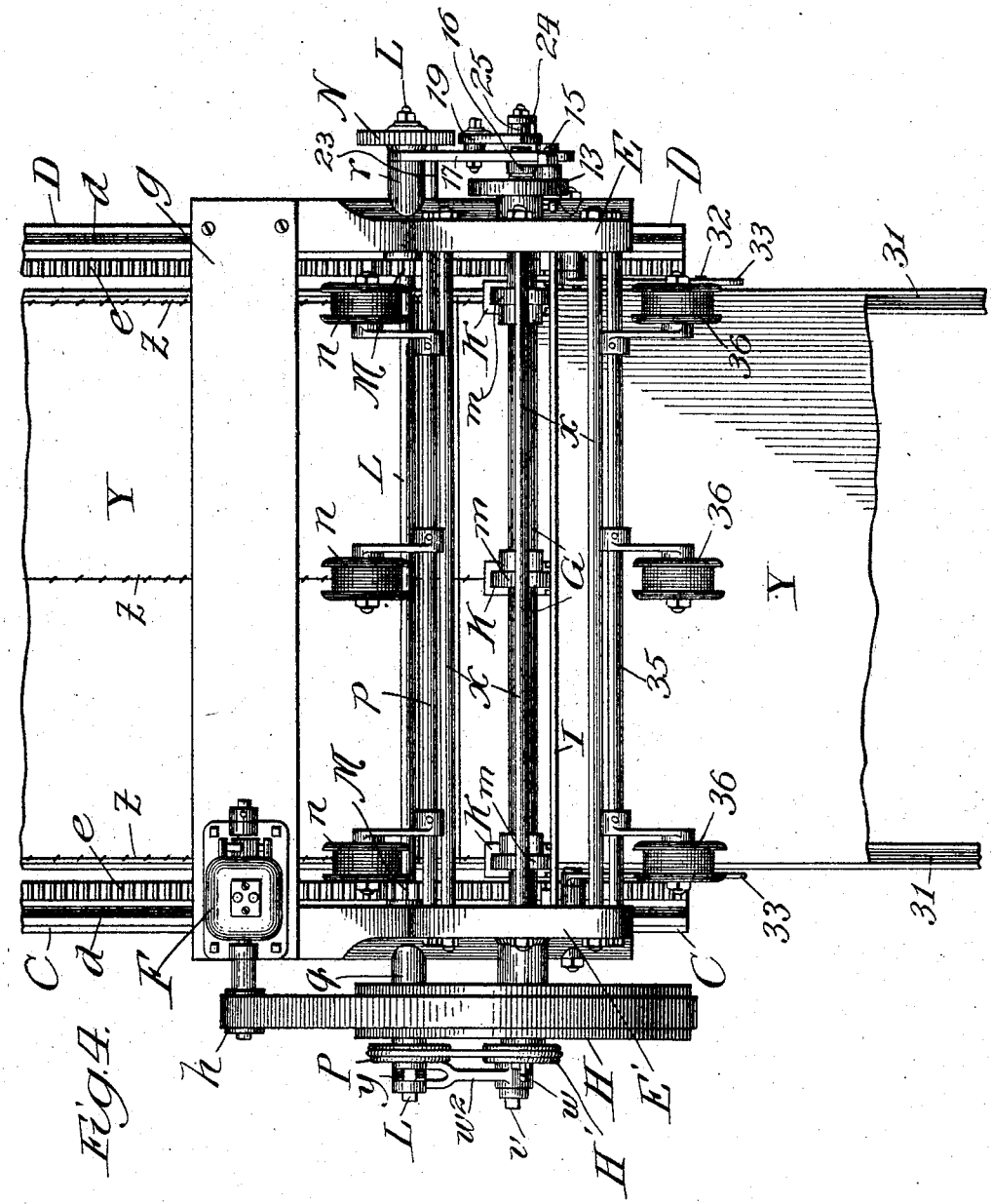

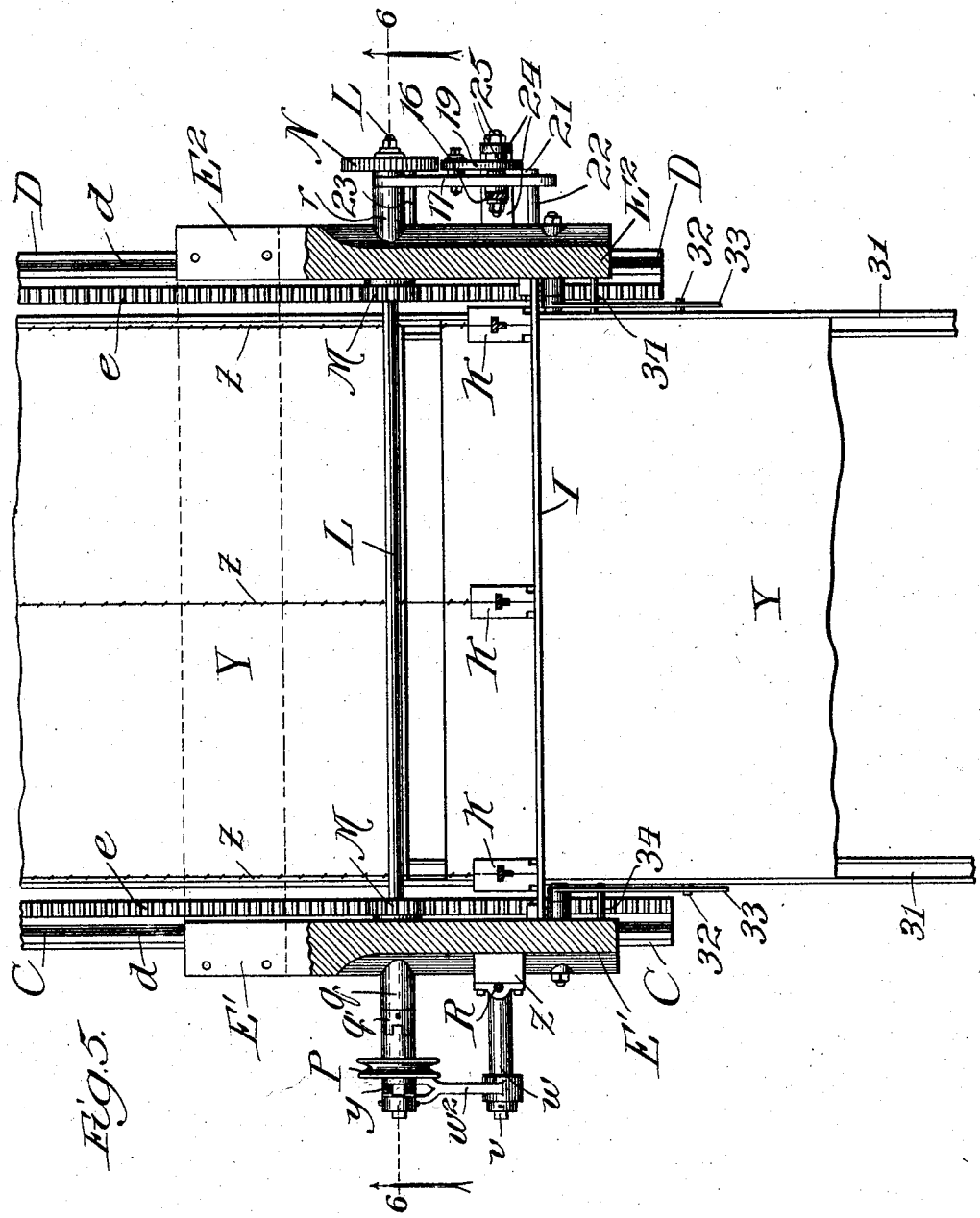

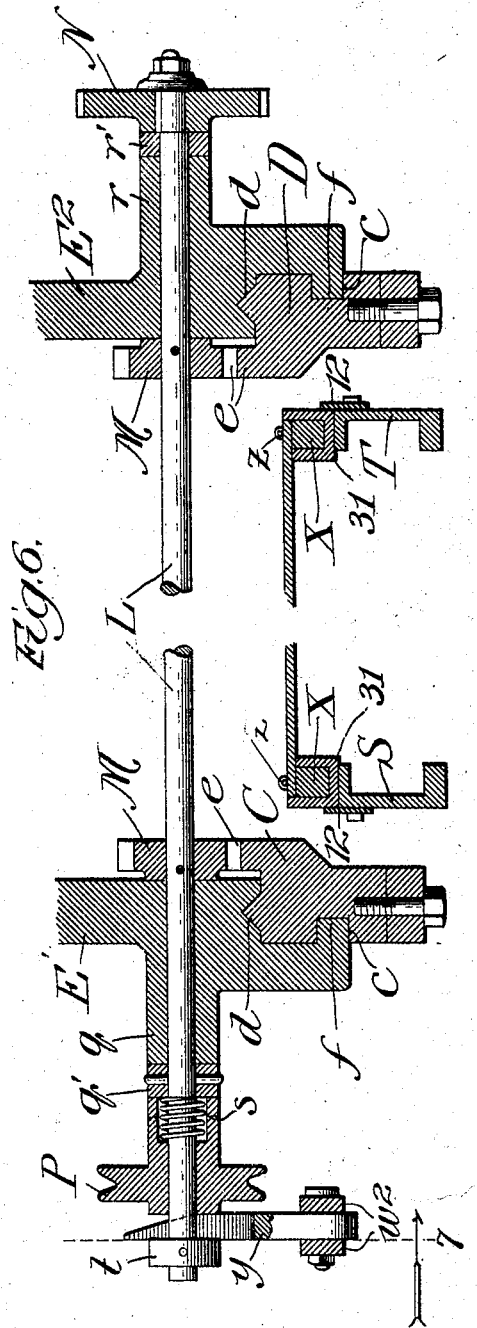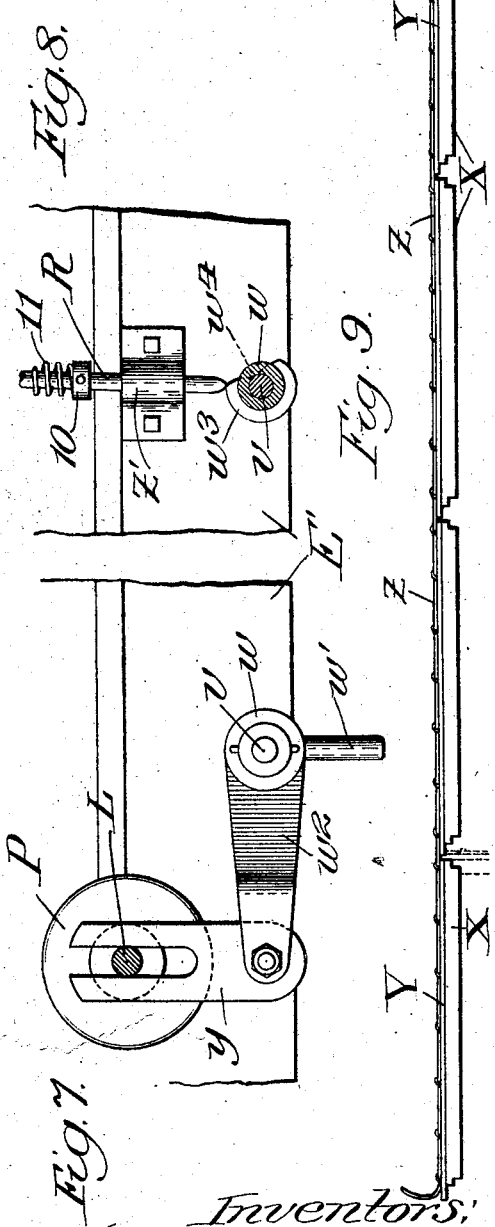

RICHARD G. INWOOD AND PERRY C. LAVENBERG, OF SOUTH BEND, INDIANA, ASSIGNORS TO THE NATIONAL WIRE BOUND BOX COMPANY, OF SOUTH BEND, INDIANA, A CORPORATION OF INDIANA.

MACHINE FOR MAKING BOX-BLANKS.

No. 806,411.      Specification of Letters Patent.      Patented Dec. 5, 1905.

Application filed January 3, 1905. Serial No. 239,415.

*To all whom it may concern:*

Be it known that we, RICHARD G. INWOOD and PERRY C. LAVENBERG, citizens of the United States, residing at South Bend, in the county of St. Joseph and State of Indiana, have invented a new and useful Improvement in Machines for Making Box-Blanks, of which the following is a specification.

Our invention relates to improvements in machines for tacking, preferably with staples, assembled members of blanks or the like for the purpose of fastening them together, and more especially for stapling to each other sheets, cleats, and binding-wires in proper relation to produce blanks for wire-bound receptacles, boxes, or other packages. The wire-bound boxes referred to are usually rectangular in shape, having solid ends, the four sides being of thin lumber or veneer, reinforced with inside cleats step-mitered together at their ends, and binding-wires extending around the said four sides.

Our object is to provide a machine of novel and improved construction for making more especially the reinforced veneer blanks intended for the four sides of boxes, as described, which machine shall be of particularly simple and durable construction, easy to operate, and capable of manufacturing the finished blanks with comparatively great rapidity and certainty.

In the operation of our improved machine in its preferred form the cleats and sheet or sheet-sections necessary for a blank are assembled in a device called a "former" adapted to receive and hold the parts in proper relation and passed with the former onto the bed of the machine to remain stationary during the stapling operation. On the machine is a traveling carrier with driving means for moving it intermittently toward one, preferably the feed, end of the machine and for reversing it when it has reached said end and moving it rapidly toward the other end of the machine, the reciprocating movement of the carrier intermittently in one direction and steadily in the opposite direction being continuous. On the carrier are stapling devices which may be staple forming as well as driving devices, actuated in the intermittent movement of the carrier to staple the blank material for the purpose of fastening the sheet and cleats together and alternating in their staple-driving operations with the traveling movements of the carrier. Means are also provided on the carrier for feeding binding or strengthening wires beneath the staples to be straddled thereby as they are driven through the sheet into the cleats. In the present machine the reciprocating movements of the carrier and stapling devices are produced by power from an electric motor mounted upon the carrier, and means are also provided for causing the carrier in its return movement to discharge the finished blank and its former from the machine and at the same time draw another former with cleats and sheets assembled thereon into the machine to be stapled together and reinforced with binding-wires.

Referring to the accompanying drawings, which show our machine of one desirable construction, Figure 1 is a broken elevation of one side of the machine; Fig. 2, a similar view of the opposite side of the machine; Fig. 3, a partly-sectional end view taken on line 3 in Fig. 2; Fig. 4, a broken plan view of a portion of the machine; Fig. 5, a plan section taken on line 5 in Fig. 2; Fig. 6, an enlarged broken vertical section taken on line 6 in Fig. 5 and showing certain details of the construction; Fig. 7, a fragmentary section taken on line 7 in Fig. 6; Fig. 8, an enlarged fragmentary section taken on line 8 in Fig. 3; and Fig. 9, an edge view of a finished box-blank, indicating by dotted lines the manner of folding the blank to form the sides of a box.

The bed-frame of the machine is upon legs A, suitably braced by lower cross-bars $a$ and longitudinally-extending bars $b$, upper cross-bars B, and longitudinally-extending top side rails C D, all fastened together with bolts. The top rails C D are formed with longitudinally-extending grooves $c$ in their outer sides, longitudinally-extending V-shaped guides $d$ on their upper sides, and longitudinally-extending racks $e$ on their upper inner sides.

E is a carrier or carrier-frame having the side cheeks E' E² preferably of the shapes indicated and fastened together with tie-rods $x$. The lower parts of the cheeks have tongues $f$ fitting the grooves $c$ of the stationary side rails, and V-shaped grooves fitting the V-shaped guides or tongues $d$, as shown most plainly in Fig. 6. Connecting the cheeks at one end is a cross-plate g, upon which is mounted an electric motor F, having an armature-shaft carrying a belt-pulley h. Journaled at opposite ends in the cheeks E' E² is a shaft G, provided between the cheeks with a longitudinally-extending feather or groove i. Loosely mounted upon the shaft G at the outer side of the cheek E' is a large pulley or fly-wheel H. Between the hub of the pulley H and the shaft G is a clutch of common construction, which it is not thought necessary to show in detail in the present connection. It will suffice to say that it is of the well-known type, which consists of a semicylindrical rod fitting a semicylindrical groove in the shaft and adapted when turned on its axis to enter a semicylindrical groove in the hub of the fly-wheel. The rod has a laterally-projecting arm k, Fig. 1, which when moved in the rotation of the shaft against a stop turns the semicylindrical clutch-rod to release its engagement with the fly-wheel, whereby the latter rotates loosely upon the shaft without turning the same. Extending between the cheeks E' E² in the position shown is a cross-bar I, upon which are slidably mounted stapling devices K. These devices are actuated by connecting-rods l, reciprocated by eccentrics m on the shaft G. The hubs of the eccentrics fit the groove or feather i on the shaft in a manner to rotate with the shaft and permit their being slid longitudinally of the shaft for purposes of adjustment in adjusting the staple-drivers.

Any suitable form of staple-driver K may be employed, and we prefer to provide devices which will form the staples and then drive them in the downstrokes of the connecting-rods l. In the figures we have shown spools n, adjustably mounted upon a shaft p for supplying wires to the stapling devices, from which the staples to be driven are formed in a common manner.

Extending through sleeve-bearings q on the cheek E' and r on the cheek E² (see Fig. 6) is a shaft L, provided beyond the said bearings with collars q' r', respectively, as shown. Fastened to the shaft L at the inner sides of the cheeks are gear-wheels M M, engaging the longitudinal racks e. Keyed to the shaft L beyond the washer or collar r' is a ratchet-wheel N. Loose upon the shaft beyond the collar q' is a pulley P, belted, as shown in Figs. 1 and 3, to a pulley H', integral with the hub of the fly-wheel H. The hub of the pulley P and the collar q', which is fast to the shaft, are provided on their adjacent faces with intermeshing teeth, forming them into clutch members normally held apart by an intervening spring s. The spring s tends to slide the pulley P toward a collar t at the end of the shaft, thereby disengaging the clutch members and causing the pulley P to rotate loosely on the shaft L. Loosely surrounding a stub-shaft v, extending outward from the lower edge of the cheek E', is a sleeve w, provided toward its inner end with a downwardly-extending pin w' and toward its opposite end with an arm w², having a bifurcated end. Pivotally mounted in the bifurcated end of the arm w² is a bifurcated wedge y, movable across the shaft L between the pulley or clutch member P and collar t. Integral with the sleeve w at its inner end is a cam w³. (Shown most plainly in Fig. 8.) Passing through guides z z' on the cheek E' is a plunger-rod R. On the rod above the guide z' is a collar 10, and surrounding the rod and confined between the collar 10 and guide z is a spring 11, which tends normally to press the rod in the downward direction. The rod R at its lower end rests upon the cam w³, and when engaging the depressed portion w⁴ of the cam is at its upper end out of the path of the arm k of the clutch, which, as before stated, is between the fly-wheel H and shaft G.

Fastened upon the cross-bars B of the bed-frame are longitudinally-extending bars S T V. The bars S and T are channel-bars, as shown, and the bar S may be permanently fastened in place directly under the staple-driver at that side of the machine. The bar T may be slid laterally to position it under the staple-driver at that side wherever the same may be adjusted. On the outer upper edges of the bars S T are raised guide-flanges 12. In the machine illustrated the bar V is in the form of an I-beam, terminating at its upper end in a plane above the tops of the bars S T for the purpose hereinafter described. The bar V may be adjusted laterally to register with the intermediate staple-driver K shown.

Keyed to the end of the shaft G beyond the cheek E² is a disk 13, provided at one side with a radially-extending dovetail slot 14. Fastened in the slot 14 is a slidingly-adjustable block 15, to which is pivotally secured at its upper end a connecting-rod 16. Fulcrumed at one end upon the shaft L is a swinging lever 17, provided along its free end portion with a slot 18. The connecting-rod 16 is pivotally connected at its lower end to the lever 17 at the slot 18, along which it may be adjusted and fastened in adjusted position.

19 is a counterweighted pawl pivotally mounted upon the lever 17, as indicated, and adapted normally to engage the ratchet-wheel N, which is keyed to the shaft L. On the swinging pawl is a finger 20, adapted to engage the socket of a spring 21, which is fastened against the cheek E² at 22 and bears normally against a pin or stop 23 on the cheek, as shown in Fig. 2. On the bed-frame in the position shown is a permanent bracket 24, carrying an inwardly-projecting pin 25 in the path of the under inclined or cam-shaped edge of the weighted side of the pawl 19. Adjustable along the bed-frame is a bracket 26, also carrying an inwardly-extending pin 27 in the path of the upper edge of the weighted side of the pawl 19. In the path of the downwardly-projecting arm or finger $w'$ of the sleeve $w$ in the position shown is a fixed pin or stop 28, and adjustable along the side of the bed-frame is a bracket 29, carrying an outwardly-extending pin 30, also in the path of the finger $w'$.

Beyond the receiving end of the bed-frame is an assembling-table W. The former before mentioned consists in whole or in part of a pair of channel-bars 31. (Shown in section in Fig. 6.) The channel-bars are provided near their forward ends with laterally-projecting pins 32. On the inner side of each cheek of the carrier E is a swinging latch 33, resting normally upon a stop 34 and adapted to engage the pins 32 on the sides of the former-bars.

Parallel with the shaft $p$ on the opposite side of the carrier-frame is a shaft 35, carrying laterally-adjustable spools 36 for strengthening-wires which unwind from the spools and pass beneath the staple-drivers to be straddled by staples in the manner common in machines of this class.

In operation the electric motor F drives the fly-wheel H. The drawings show the carrier E at the limit of its travel at the receiving end of the machine. The pin $w'$ has contacted with the stop 28, thereby rocking the sleeve $w$ to cause the cam $w^3$ to raise the rod R, as shown in Fig. 8, and move the upper end of said rod in the path of the clutch-arm $k$, whereby the fly-wheel H and its pulley H' rotate loosely upon the shaft G without turning the latter. The arm $w^2$ on the sleeve $w$ has been raised in the rocking motion of the sleeve described to move the wedge $y$ to the position shown in Fig. 6, whereby the clutch members P $q'$ are in engagement and rotate the shaft L to turn the pinions M and cause the carrier to be moved thereby along the rack toward the discharge end of the machine. In the movement of the traveling carrier to the receiving end of the machine the weighted end of the pawl 19 has engaged and slid upon the pin 25 and been swung thereby to the position shown in Fig. 2, wherein the finger 20 has been caught by the socket of the spring 21 to hold the pawl out of engagement with the ratchet-wheel N. Cleats X, of the form shown in cross-section in Fig. 6 and in side elevation in Fig. 9, are placed by an attendant in the parallel channel-iron former-bars 31 to extend with relation to each other, as shown in Fig. 9, and sheets Y of veneering are placed by the attendant upon the cleats in the former. The former with the sheets and cleats in position are passed along the assembling-table W to the position indicated in Figs. 1, 2, and 5, whereby as the traveling carrier reaches the position shown the latches 33 engage the pins 32. The turning of the fly-wheel, pulley H' thereon, and pulley P, which, as stated, is then clutched to the shaft L, causes the latter to be rotated in the direction of the arrow, Fig. 1, to turn the pinions M and move the carrier rapidly toward the discharge end of the machine. This travel of the carrier continues until the arm $w'$ contacts with the pin 30 and the top of the weighted end of the pawl strikes the pin 27. The first said action causes the sleeve $w$ and attendant parts to be rocked, whereby the rod R descends in the part $w^4$ of the cam and the wedge $y$ is withdrawn from between the collar $t$ and pulley or clutch member P. The disengagement between the clutches P and $q'$ thus effected stops rotation of the shaft and pinions M, thereby stopping the movement of the traveling carrier. The release of the clutch-arm $k$ by the rod R throws the shaft G into engagement with the fly-wheel, to be rotated thereby.

In the movement of the carrier from the position shown to the end of its travel toward the discharge-end of the machine the latches 33, owing to their engagement with the pins 32 on the former-bars, draw the latter, with the cleats and sheets assembled therein, into position on the bed-frame. When the shaft G begins to rotate, the pawl 19, which has been released from engagement with the spring 21 through its contact with the pin 27, is swung up and down to give intermittent motion to the ratchet-wheel N, and thereby rotate the shaft L intermittently and produce intermittent travel of the carrier in the direction of the feed end of the machine. The parts upon the shaft G are so arranged with relation to each other that in the downstroke of the connecting-rod 16, which produces turning of the shaft L and travel of the carrier, as described, the connecting-rods $l$ and the staple-drivers are raised, and in the rise of the connecting-rod 16, which disengages the pawl from the ratchet and stops movement of the carrier, the connecting-rods $l$ are plunged downward to cause the staple forming and driving machines to drive staples. As the carrier moves thus intermittently the binding-wires Z from the spools 36 pay out, so that the staples straddle the wires as they are driven through the sheets into the cleats at opposite edges of the blank. The central staple forming and driving device K is adapted to form relatively small staples, which when driven straddle the central binding-wire and are clenched under the sheet Y against the anvil formed by the bar V. By adjusting the connecting-rod 16 at its upper end along the slot 14 or at its lower end in the slot 18 of the lever 17, or both, the sweep of the pawl in each downward movement may be regulated to regulate the distance of travel of the carrier between the stapling operations. Thus the staples may be driven at the desired distance apart.

While one blank is being stapled or "stitched," as described, the attendant assembles material for another blank in another pair of former-bars 31 and passes them into the end of the machine in position to be engaged by the latches 33 when the carrier completes its intermittent travel toward the feed end, Preferably the blank material is passed far enough into the machine to receive one or two staples before the traveling carrier stops, whereby in the return movement of the carrier the latter positively engages the blank material, as well as the former-bars, to draw them into the machine, as before described. In drawing the material for a blank into the machine the carrier discharges the finished blank from the machine and another attendant thereupon severs the binding-wires between the blanks to cause the ends of the wires Z to extend approximately as shown in Fig. 9.

The binding-wire spools, staple-wire spools, and stapling devices may be adjusted along their shafts for operating upon blanks of any desired width, and the brackets 26 29 may be shifted along the bed-frame to stop and reverse the carrier at any point depending upon the length of the blanks. Thus it will be readily seen that the machine may be very quickly adjusted to different sized blanks. The machine may operate as fast as an attendant can place the formers, with the assembled blank material thereon, in position. The speed of intermittent travel of the carrier would only be limited by the speed at which the staple forming and driving devices may safely operate, and the return movement of the carrier may be at any desired speed. Thus the capacity of the machine for manufacturing box-blanks is only limited by the speed at which a skilled attendant may be able to place the formers with the blank material in the machine.

While we prefer to construct the machine throughout as shown and described, it may be variously modified in the matter of details of construction without in any way departing from the spirit of our invention as it is defined by the claims.

What we claim as new, and desire to secure by Letters Patent, is—

1. Mechanism for making wire-bound box-blanks by stitching together the parts of the blank material, comprising, in combination, a stationary frame, a traveling carrier with means for moving it longitudinally of the frame, a plurality of stapling devices with operating means therefor on the carrier, cleat and sheet assembling mechanism movable longitudinally into and out of a position on the frame wherein the material will be traversed by the carrier, and means operating in the travel of the carrier to position binding-wires beneath the stapling devices along the sheets.

2. Mechanism for making wire-bound box-blanks by stitching together the parts of the blank material, comprising, in combination, a stationary frame, a traveling carrier with means for moving it longitudinally of the frame, a plurality of stapling devices with operating means therefor on the carrier, cleat and sheet assembling mechanism movable longitudinally into and out of a position on the frame wherein the material will be traversed by the carrier, the parts being constructed and arranged whereby the material and staple-drivers remain in fixed relation to each other while staples are being driven, and means operating in the travel of the stapling devices to feed binding-wires between them to the said material.

3. In a machine for making blanks of the character set forth, the combination with a bed on which the assembled blank material is positioned, of a traveling-carrier frame, means for moving the frame intermittently to cross the positioned blank material, intermittently-operating staple-drivers on the carrier-frame alternating in their staple-driving operations with the movements of the carrier-frame and operating means for the staple-drivers.

4. In a machine for making blanks of the character set forth, the combination with a bed on which the assembled blank material is positioned, of a traveling carrier, intermittently-operating staple-drivers on the carrier, means for moving the carrier intermittently in one direction, its movements alternating with the staple-driving operations of the staple-drivers, means for arresting the operations of the staple-drivers means for moving the carrier-frame continuously in the opposite direction and operating means for the staple-drivers.

5. In a machine for making blanks of the character set forth, the combination with a bed on which the assembled blank material is positioned, of a carrier-frame on the bed, intermittently-operating tacking devices on the carrier, means for moving the carrier in one direction to cross the positioned blank material while the tacking devices are in operation, means for stopping the operations of the tacking devices, means for reversing the movement of the carrier, on completion of a blank, to discharge the blank and operating means for the tacking devices.

6. In a machine for making blanks of the character set forth, the combination with a bed on which the assembled blank material is positioned, of a carrier-frame on the bed, intermittently-operating stapling devices on the carrier, means for moving the carrier in one direction to cross the positioned blank material while the stapling devices are in operation, means for stopping the operations of the stapling devices means for reversing the movement of the carrier on completion of a blank to discharge the blank, means upon the carrier operating in the final movement thereof during the stapling operations to engage assembled material for another blank to draw the same into the machine while discharging the finished blank and operating means for the staple-drivers.

7. In a machine for making blanks of the character set forth, the combination with a bed on which the assembled blank material is positioned, of a traveling-carrier frame movable along the bed to cross the positioned blank material, a motor, a drive-wheel on the carrier-frame driven by the motor, tacking devices on the carrier-frame, intermittent operating mechanism for the tacking devices and intermittent operating mechanism for moving the carrier in one direction, means for throwing said intermittent mechanisms simultaneously into and out of operative engagement with said drive-wheel, mechanism for reversing the movement of the carrier and means for automatically throwing said reversing mechanism into operative engagement with said drive-wheel as the said intermittent mechanisms are disengaged therefrom, substantially as described.

8. In a machine for making box-blanks, the combination with the bed-frame of the machine adapted to hold the material for one blank, of a traveling carrier on the frame, mechanism for moving the carrier at one speed intermittently across the blank material toward the receiving end of the machine, intermittently-actuated staple-drivers on the carrier alternating in their staple-driving operations with the intermittently-operating carrier-moving mechanism, means for reversing the movement of the carrier and causing it to travel at increased speed toward the discharge end of the bed-frame, and blank-material-engaging means on the carrier operating to engage the material for a new blank and draw it into the machine while discharging a finished blank.

RICHARD G. INWOOD.
PERRY C. LAVENBERG.

In presence of—
J. H. LANDES,
F. M. WIRTZ.